(12) United States Patent
Trabattoni et al.

(10) Patent No.: US 8,156,864 B2
(45) Date of Patent: Apr. 17, 2012

(54) WORKPIECE DEFORMING PRESS INCLUDING A SAFETY DEVICE

(75) Inventors: Roberto Trabattoni, Desio (IT); Enzo Fontaneto, Borgomanero (IT)

(73) Assignee: SACMA LimBiate S.p.A., LimBiate (IT)

(*) Notice: Subject to any disclaimer, the term of this patent is extended or adjusted under 35 U.S.C. 154(b) by 279 days.

(21) Appl. No.: 12/487,764

(22) Filed: Jun. 19, 2009

(65) Prior Publication Data

US 2009/0314048 A1 Dec. 24, 2009

(30) Foreign Application Priority Data

Jun. 19, 2008 (IT) .............................. MI2008A1113

(51) Int. Cl.
*F16P 1/00* (2006.01)

(52) U.S. Cl. .............................. 100/349; 74/614; 72/324

(58) Field of Classification Search .................. 100/349, 100/350, 352; 192/134; 74/608, 612, 614, 74/615; 72/324, 455; 29/708
See application file for complete search history.

(56) References Cited

U.S. PATENT DOCUMENTS

| | | | | |
|---|---|---|---|---|
| 3,996,815 A | * | 12/1976 | Walker ............................ | 74/612 |
| 6,490,781 B2 | * | 12/2002 | Kanai et al. ..................... | 29/708 |
| 7,127,931 B1 | * | 10/2006 | Borders .......................... | 72/404 |

* cited by examiner

*Primary Examiner* — Jimmy T Nguyen
(74) *Attorney, Agent, or Firm* — Kirschstein, et al.

(57) ABSTRACT

A workpiece deforming press, including a safety device, comprises a press housing for housing therein a plurality of dies and punches arranged in a horizontal plane, wherein a press housing delimiting wall comprises a top horizontal guide bearing a sliding slide, wherein said sliding slide bears, through a linear actuator, a first overturning plane, supported by a fulcrum and adapted to be actuated by a linear actuator, and wherein said sliding slide further bears a second overturning plane supported by a fulcrum and adapted to be actuated by a cylinder-piston unit.

6 Claims, 6 Drawing Sheets

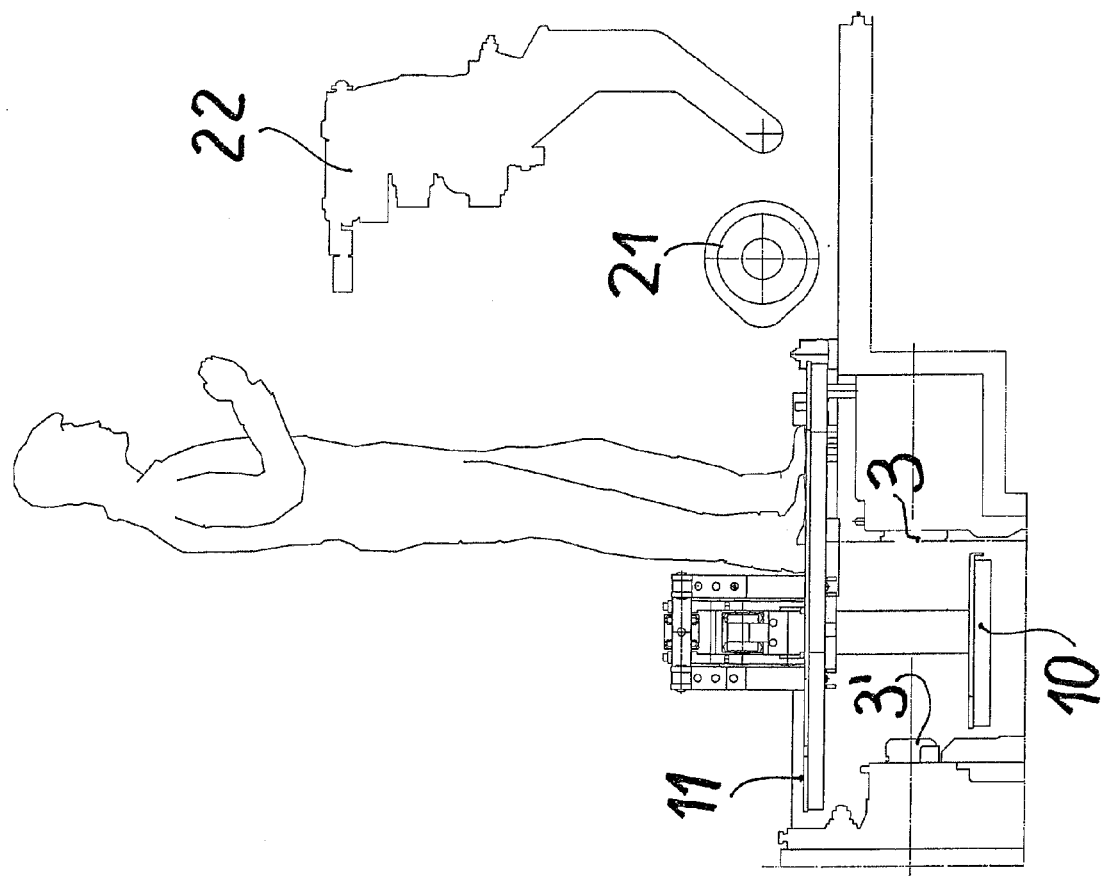

WORKPIECE DEFORMING PRESS INCLUDING A SAFETY DEVICE

BACKGROUND OF THE INVENTION

The present invention relates to a workpiece deforming press including a plurality of press dies, arranged on a horizontal plane included in the press housing.

The above prior dies control corresponding die punches, thereby it is possible to deform, by said dies and punches, the workpiece, starting from a raw workpiece body which is gradually deformed to provide a finished shaped or contoured workpiece.

Deforming presses of the above mentioned type are already known in the prior art.

The dies and punches, in prior large size presses, are arranged in a press housing having a comparatively large size and depth.

The press housing is upward open and, for adjusting the die and punch tools, and for replacing the latter as necessary, the press operator must necessarily access the press housing. Before performing such an access, the deforming press must be turned off, to prevent the press operator from being seriously damaged because of an uncontrolled movement of the deforming punches toward the press dies.

Unfortunately, the accident factor is frequently a permanent one, since the press operator frequently does not remember to turn off the press, as required by safety rules. Moreover, some deforming tool adjusting operations require a step by step movement between the deforming dies and punches.

Safety rules and standards require moreover to provide, in operating machines in general, safety means to prevent the machine operator from being damaged by movable machine elements. However, even if these safety rules are observed, it is not possible to fully eliminate dangerous conditions occurring in performing necessary operations on tools and equipments, for example on the press dies or punches.

In particular, the above mentioned inevitable dangers are related to a hindered movement at the working region near the dies and punches, and to the fact that, at this region, deposits of oil, dirt, or metal chips are always present.

SUMMARY OF THE INVENTION

Accordingly, the main object of the present invention is to provide such a safety device adapted to overcome the above mentioned drawbacks of the prior art, and allowing an operator to safely approach the deforming press tools without accessing the deforming press housing.

Another object of the invention is to provide such a safety device allowing the press tool region to be easily and safely accessed, thereby reducing as far as possible any slipping, stumbling and falling dangers for the operator.

Another object of the invention is to safely prevent covering panels from being soiled by oil which could cause the press operator to slip.

According to the present invention, the above mentioned objects are achieved by a workpiece deforming press, including a press for housing therein a plurality of press dies and punches arranged on a horizontal plane in said press housing, wherein a wall delimiting said press housing comprises a top horizontal guide bearing a sliding slide, wherein said sliding slide bears, through a linear actuator, a first overturning plane, supported by a fulcrum and adapted to be actuated by a linear actuator and wherein said sliding slide further bears a second overturning plane supported by said fulcrum and adapted to be actuated by a cylinder-piston unit.

In this connection it should be pointed out that the term "linear actuator" means herein hydraulic cylinders, pneumatic cylinders, a worm screw-nut screw assembly or the like devices.

BRIEF DESCRIPTION OF THE DRAWINGS

Further characteristics of the press according to the present invention will become more apparent hereinafter from the following description, the dependent claims and the accompanying drawings.

The subject matter of the present invention will be disclosed in a more detailed manner hereinbelow with reference to an exemplary embodiment thereof which is shown in the accompanying drawings, where:

FIG. 6 is a schematic side view showing the press housing closed by an overturning plane or panel.

DESCRIPTION OF THE PREFERRED EMBODIMENTS

Figure 1:
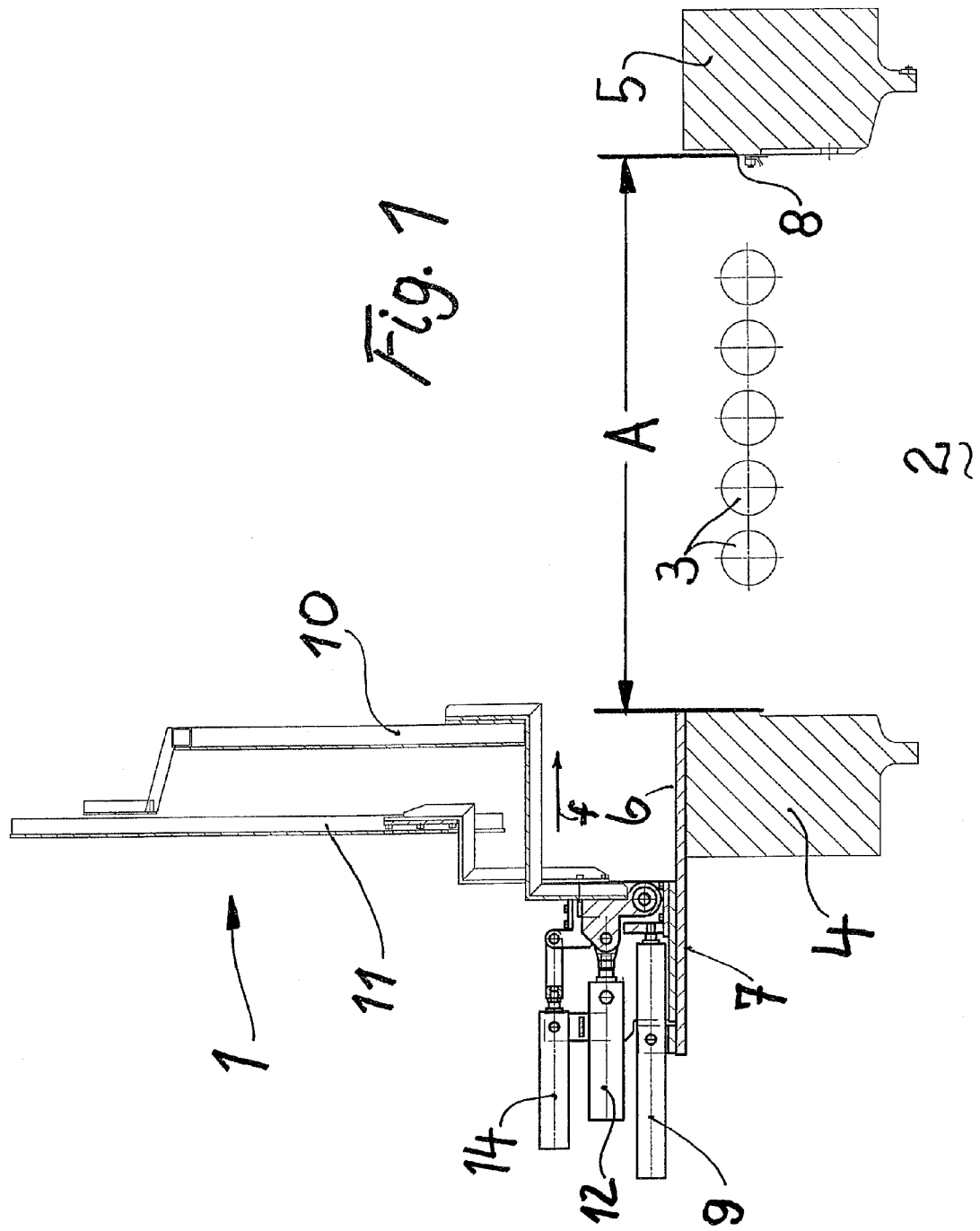
FIG. 1 shows the housing of the deforming press including the deforming dies and having a safety device in an idle or deactuated condition thereof.

FIGS. 1 to 4 show the region of the dies in a cold deforming press, generally indicated by 1.

The press 1 has a comparatively deep housing, indicated by 2. This press housing 2 includes, on a horizontal plane, a plurality of dies 3 cooperating with punches 3' to gradually deform the workpieces.

The provision of a service housing 2, as well as the arrangement of the dies 3 and corresponding deforming punches 3' are well known in the prior art.

The press housing 2 is delimited by delimiting shoulders or walls 4 and 5 of the press body, said walls being spaced from one another by a distance A.

The wall 4 comprises a top horizontal guide indicated by 6. On the guide 6 is movably arranged, on a horizontal plane, a strong slide 7.

The wall 5, opposite to the wall 4, comprises a bearing step 8 which will be disclosed in a more detailed manner hereinafter.

In FIG. 1, the slide 7 is reversely driven by a linear actuator 9, to prevent the two overturning planes 10 and 11 from hindering a free access (A) to the press housing 2.

Figure 2:
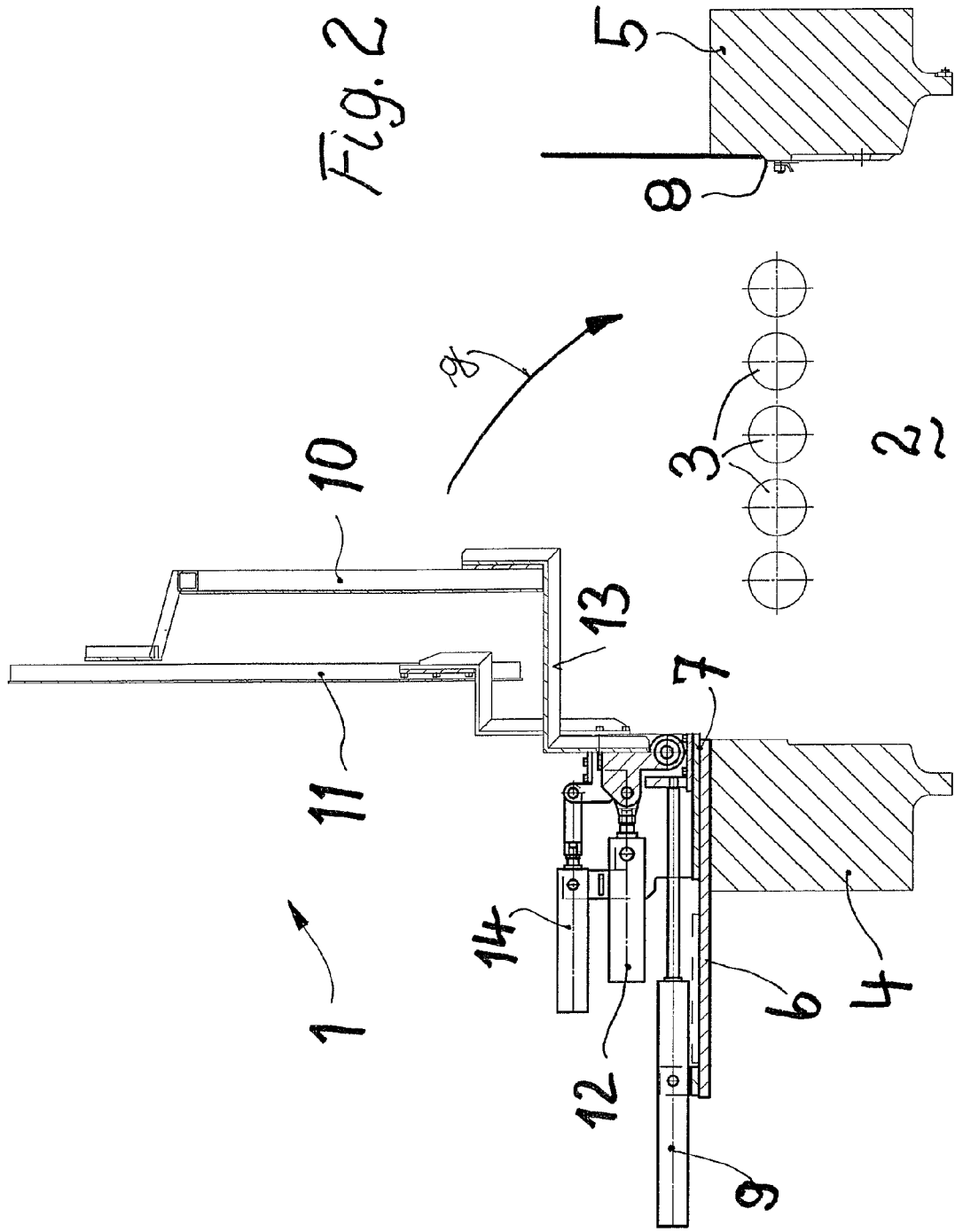
FIG. 2 shows the device of FIG. 1, with the safety means brought from a rest or standby position thereof to an actuated position thereof.

Thus, by operating the linear actuator 9, as shown in FIG. 2, the slide 7 is forwardly driven on the guide 6 to arrange the overturning planes 10 and 11 above the press 1 housing 2.

Figure 3:
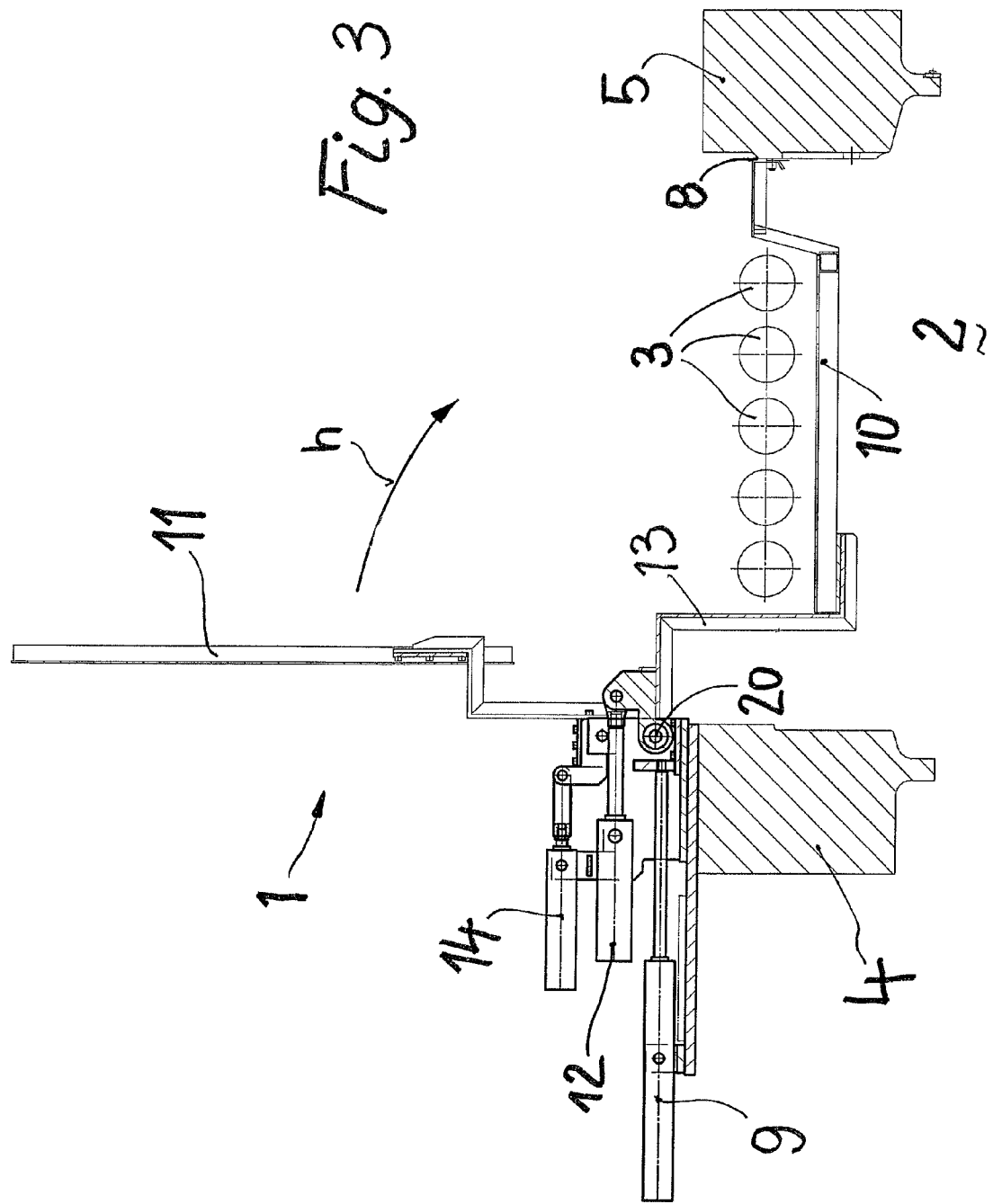
FIG. 3 shows the device according to FIG. 1, with a first safety means in a working position or condition thereof.

On the other hand, by operating the linear actuator 12, as shown in FIG. 3, the first overturning plane 10, supported by a supporting fulcrum 20, is overturned to a horizontal position, thereby closing the underlying housing 2, in this horizontal position, the plane 10 bearing by its free end portion on an abutment step 8, formed inside the wall 5.

Thus, with the first plane 10 arranged at a horizontal position, as shown, this plane 10 can be traveled over and, accordingly, the operator may perform, at a commode and safe position, adjusting, respectively replacing, operations on the tools, for example of the dies 3 and punches 3'.

Accordingly the operator must not access the deep housing 2 and, consequently, he will not be subjected to dangers.

Advantageously, the plane 10 is supported by a Z-shape structure 13.

Thus, it is possible to bring the plane 10 to a slightly lower level inside the recess 2, to allow the operator to easily operate or adjust the dies 3 and punches 3'.

Figure 4:
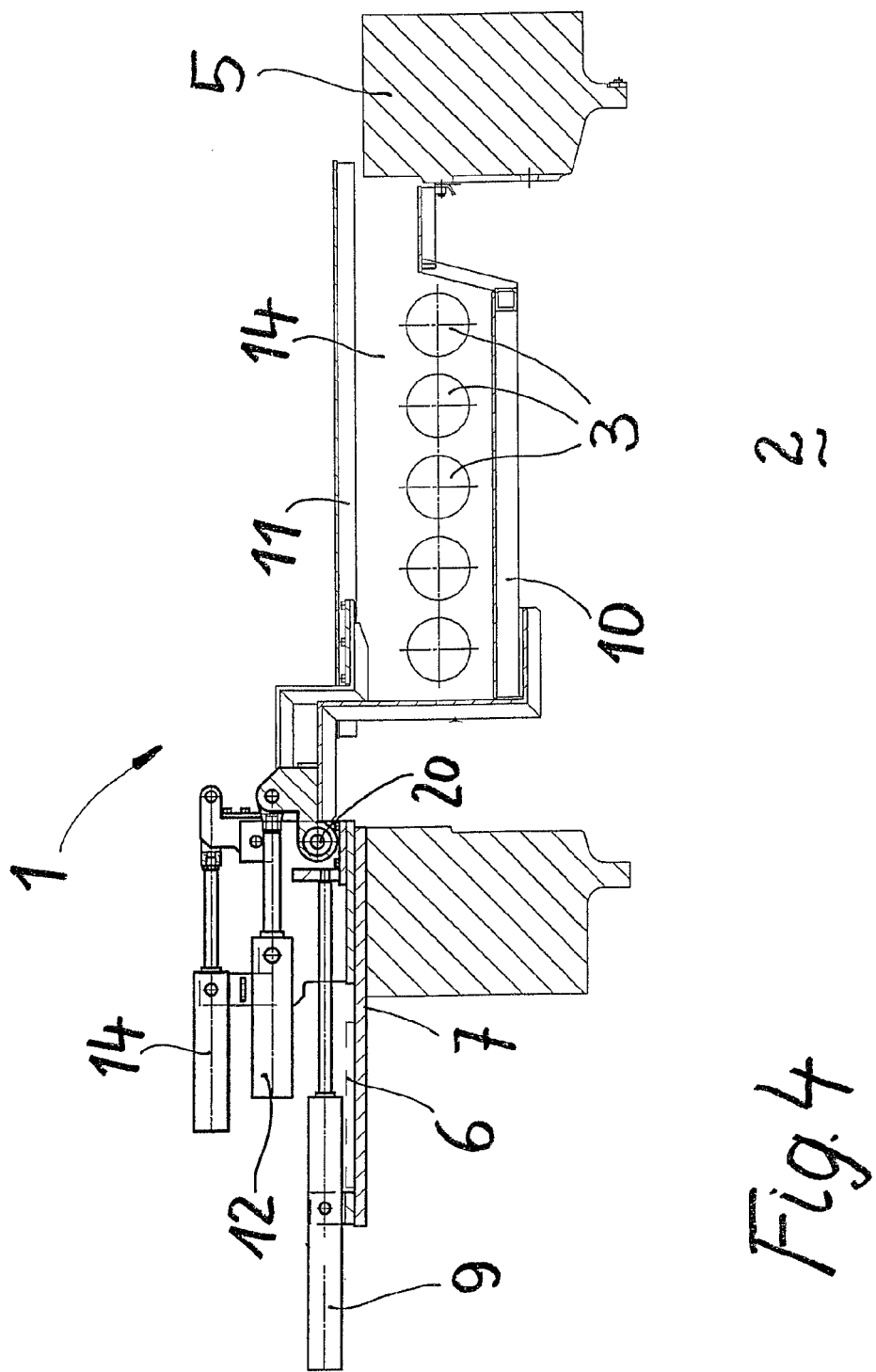
FIG. 4 shows the device of FIG. 1, with both the safety devices in a working position thereof.

By actuating the cylinder-piston unit 14, as shown in FIG. 4, the second overturning plane 11 is also oscillated from a vertical position, shown in FIGS. 1, 2 and 3, to a horizontal position, at which it will safely bear on the top of the wall 5 while safely closing the housing including the dies 3 and punches 3'.

Figure 5:
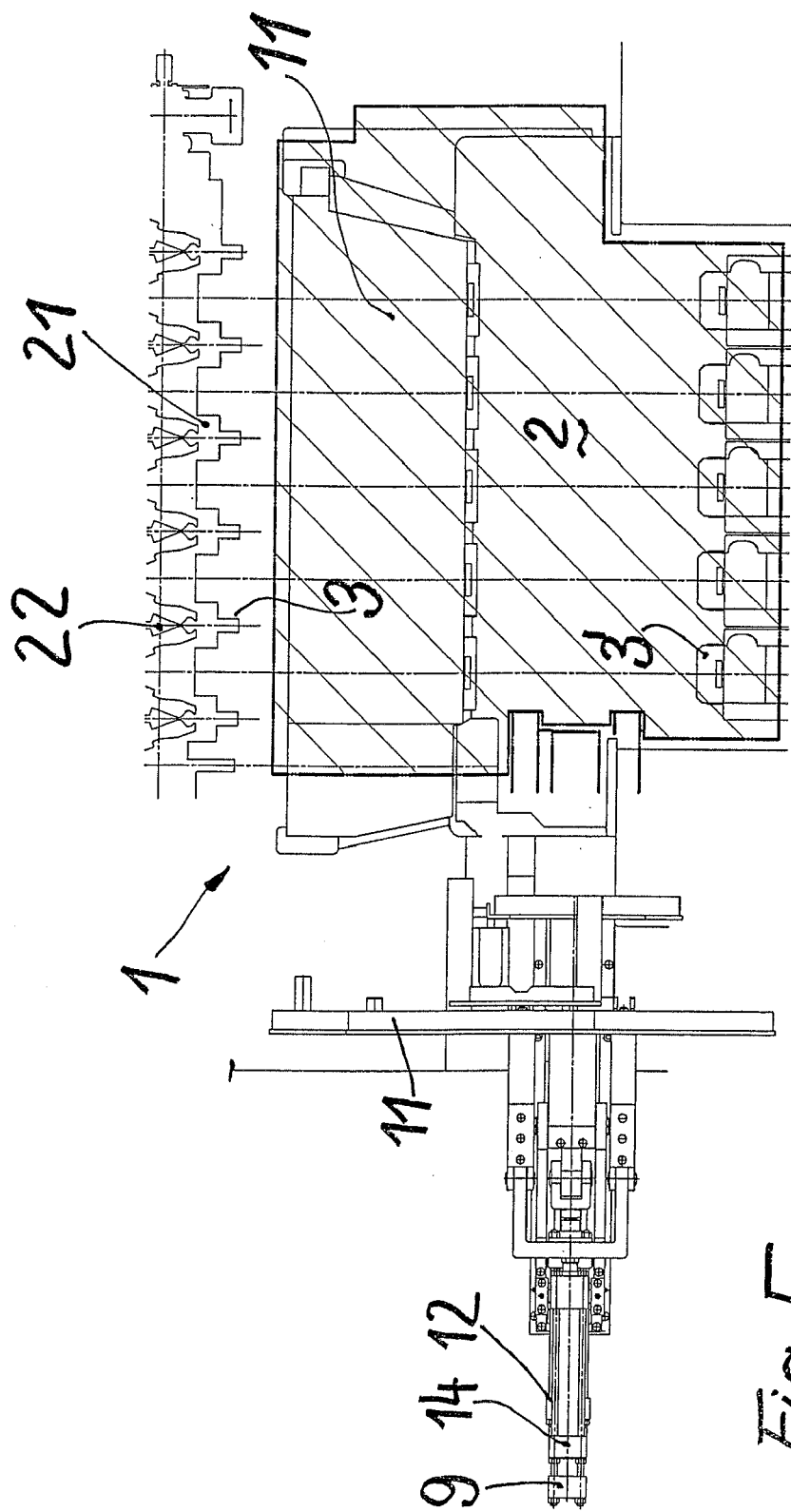
FIG. 5 is a schematic top plan view showing the press housing with the second safety means both in a rest vertical position and in a horizontal working position thereof.

FIG. 5 is a schematic top plan view showing the second overturning plane 11 which, in its working horizontal position, fully closes the housing 2 between the dies 3 and punches 3', thereby providing a safe trampling on plane.

FIG. 6 shows the overturning plane 11 easily accessed by the operator to replace and adjust the grippers 22 of the transfer unit, overturned through about 90° from the working position, and to also adjust the gripper opening and closing cams 21.

Thus, by operating the linear actuator 9, the slide 7 and overturning planes 10, 11, still arranged at a vertical position, are driven (f) to their overturned position (FIG. 2).

On the other hand, by operating the linear actuator 12, the overturning plane 10 is oscillated (g) from a vertical to a horizontal position, thereby closing the press housing 2 (FIG. 3).

Finally, by operating the cylinder-piston unit 14, the overturning plane 11 is also oscillated (h) from a vertical to a horizontal position, thereby closing the housing 14 in which said dies 3 and punches (FIG. 4) operate.

To safely drive the swinging plane 10 or 11, a device is herein provided which, in a raised position of the overturning planes, actuates, at the positions shown in FIGS. 2, 3 and 4, a mechanism for preventing press elements in the press housing 2 from performing undesired movements.

The invention claimed is:

1. A workpiece deforming press with a safety device, comprising:
    a press housing for containing a plurality of press dies and a plurality of punches arranged in a horizontal plane;
    a horizontal guide supported by an upright wall that bounds the press housing;
    a slide mounted on the guide for horizontal sliding movement;
    a first safety panel pivotably mounted in a first upright position on the slide;
    a second safety panel pivotably mounted in a second upright position on the slide;
    a first linear actuator mounted on the guide, for horizontally moving the slide and the safety panels in their upright positions along the guide to an end position;
    a second linear actuator mounted on the slide, for pivoting the first safety panel from the first upright position to a first horizontal safety position in the housing when the slide is in the end position; and
    a third linear actuator mounted on the slide, for pivoting the second safety panel from the second upright position to a second horizontal safety position in the press housing when the first safety panel is in the first horizontal safety position.

2. The workpiece deforming press of claim 1, wherein the press housing has another upright wall, both upright walls being spaced apart and bounding the dies and the punches therebetween, and wherein the other upright wall has a step for supporting a free end portion of the first safety panel in the first horizontal safety position in the housing.

3. The workpiece deforming press of claim 1, wherein the first safety panel is connected to the slide by a Z-shaped structure.

4. The workpiece deforming press of claim 1, wherein the press housing has another upright wall, both upright walls being spaced apart and bounding the dies and the punches therebetween, and wherein the other upright wall has a top surface for supporting a free end portion of the second safety panel in the second horizontal safety position in the press housing.

5. The workpiece deforming press of claim 1, wherein the first and the second safety panels are at different elevations at the first and second horizontal safety positions.

6. The workpiece deforming press of claim 1, wherein the second safety panel overlies the dies and the punches in the second horizontal safety position.

* * * * *